(12) United States Patent
Yairi et al.

(10) Patent No.: US 9,557,813 B2
(45) Date of Patent: Jan. 31, 2017

(54) METHOD FOR REDUCING PERCEIVED OPTICAL DISTORTION

(71) Applicant: Tactus Technology, Inc., Fremont, CA (US)

(72) Inventors: Micah B Yairi, Fremont, CA (US); Radhakrishnan Parthasarathy, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 64 days.

(21) Appl. No.: 14/320,041

(22) Filed: Jun. 30, 2014

(65) Prior Publication Data

US 2015/0177906 A1    Jun. 25, 2015

Related U.S. Application Data

(60) Provisional application No. 61/841,176, filed on Jun. 28, 2013.

(51) Int. Cl.
| | | |
|---|---|---|
| *G06F 3/01* | (2006.01) | |
| *G06T 3/00* | (2006.01) | |
| *G09G 5/00* | (2006.01) | |

(52) U.S. Cl.
CPC .............. *G06F 3/013* (2013.01); *G06F 3/016* (2013.01); *G06T 3/0006* (2013.01); *G09G 5/00* (2013.01)

(58) Field of Classification Search
None
See application file for complete search history.

(56) References Cited

U.S. PATENT DOCUMENTS

| | | |
|---|---|---|
| 2,885,967 A | 5/1959 | C et al. |
| 3,034,628 A | 5/1962 | Wadey |

(Continued)

FOREIGN PATENT DOCUMENTS

| | | |
|---|---|---|
| CN | 1260525 A | 7/2000 |
| CN | 1530818 A | 9/2004 |

(Continued)

OTHER PUBLICATIONS

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

(Continued)

*Primary Examiner* — Ryan D McCulley
(74) *Attorney, Agent, or Firm* — Jeffrey Schox; Padowithz Dolce

(57) ABSTRACT

One variation of a method for reducing perceived optical distortion of light output through a dynamic tactile interface includes: rendering an image on a digital display coupled to a substrate opposite a tactile layer, the tactile layer defining a tactile surface, a peripheral region, and a deformable region adjacent the peripheral region, disconnected from the substrate, and operable between a retracted setting and an expanded setting, the deformable region substantially flush with the peripheral region in the retracted setting and offset above the peripheral region in the expanded setting; estimating a viewing position of a user relative to the digital display; transitioning the deformable region from the retracted setting into the expanded setting; and modifying the portion of the image rendered on the digital display according to the estimated viewing position of the user and a profile of the tactile surface across the deformable region in the expanded setting.

19 Claims, 6 Drawing Sheets

(56) References Cited

U.S. PATENT DOCUMENTS

| | | |
|---|---|---|
| 3,441,111 A | 4/1969 | P |
| 3,453,967 A | 7/1969 | L et al. |
| 3,490,733 A | 1/1970 | Jean |
| 3,659,354 A | 5/1972 | Sutherland |
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,181,476 A | 1/1980 | Malbec |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,090,297 A | 2/1992 | Paynter |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,470,212 A | 11/1995 | Pearce |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,015,894 B2 | 3/2006 | Morohoshi |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |

(56) References Cited

U.S. PATENT DOCUMENTS

| | | |
|---|---|---|
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,116,831 B2 | 2/2012 | Meitzler et al. |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |

(56) References Cited

U.S. PATENT DOCUMENTS

| | | |
|---|---|---|
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,390,771 B2 | 3/2013 | Sakai et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,922,503 B2 | 12/2014 | Ciesla et al. |
| 8,922,510 B2 | 12/2014 | Ciesla et al. |
| 8,928,621 B2 | 1/2015 | Ciesla et al. |
| 8,970,403 B2 | 3/2015 | Ciesla et al. |
| 9,035,898 B2 | 5/2015 | Ciesla |
| 9,075,429 B1 * | 7/2015 | Karakotsios .......... G06F 3/0418 |
| 9,116,617 B2 | 8/2015 | Ciesla et al. |
| 9,128,525 B2 | 9/2015 | Yairi et al. |
| 9,274,612 B2 | 3/2016 | Ciesla et al. |
| 9,274,635 B2 * | 3/2016 | Birnbaum .......... G06F 3/04886 |
| 9,372,539 B2 | 6/2016 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0312577 A1 | 12/2008 | Drasler et al. |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |

(56) References Cited

U.S. PATENT DOCUMENTS

| | | |
|---|---|---|
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1* | 7/2010 | Craig ............... G06F 3/0202 345/173 |
| 2010/0171729 A1 | 7/2010 | Chun |
| 2010/0177050 A1 | 7/2010 | Heubel et al. |
| 2010/0182135 A1 | 7/2010 | Moosavi |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1* | 9/2010 | Montgomery ......... G02B 6/005 349/15 |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0102462 A1* | 5/2011 | Birnbaum ........... G06F 3/04886 345/647 |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1* | 9/2011 | Yun .................... G06F 3/016 345/173 |
| 2011/0241442 A1 | 10/2011 | Mittleman et al. |
| 2011/0242749 A1 | 10/2011 | Huang et al. |
| 2011/0248947 A1 | 10/2011 | Krahenbuhl et al. |
| 2011/0248987 A1* | 10/2011 | Mitchell ............ G06T 15/20 345/419 |
| 2011/0254672 A1* | 10/2011 | Ciesla ............... G06F 3/016 340/407.2 |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1* | 2/2012 | Adachi ............... G09G 3/3426 345/690 |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1* | 1/2015 | Burtzlaff ............ G09G 5/08 345/419 |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| JP | s63164122 A | 7/1988 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| WO | 2004028955 A | 4/2004 |
| WO | 2006082020 A1 | 8/2006 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |

(56) References Cited

FOREIGN PATENT DOCUMENTS

| WO | 2011112984 A | 9/2011 |
|---|---|---|
| WO | 2011133604 A | 10/2011 |

OTHER PUBLICATIONS

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 (Jun. 20, 2012) pp. 1125-1154, [retrieved on Nov. 18, 2014]. Retrieved from the internet. URL: <https://www.google.com/webhp? sourceid=chrome-instant&ion=1&espv=2&ie=UTF-8#q=materials-05-01125.pdf>.

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

* cited by examiner

METHOD FOR REDUCING PERCEIVED OPTICAL DISTORTION

CROSS-REFERENCE TO RELATED APPLICATIONS

This application is related to U.S. Provisional Application No. 61/841,176, filed on 28 Jun. 2013, which is incorporated in its entirety by this reference.

TECHNICAL FIELD

This invention relates generally to touch-sensitive displays, and more specifically to a new and useful user method for reducing perceived optical distortion of light output through a dynamic tactile interface in the field of touch-sensitive displays.

DESCRIPTION OF THE EMBODIMENTS

The following description of the embodiment of the invention is not intended to limit the invention to these embodiments, but rather to enable any person skilled in the art to make and use this invention.

1. Method and Variation

Figure 1:
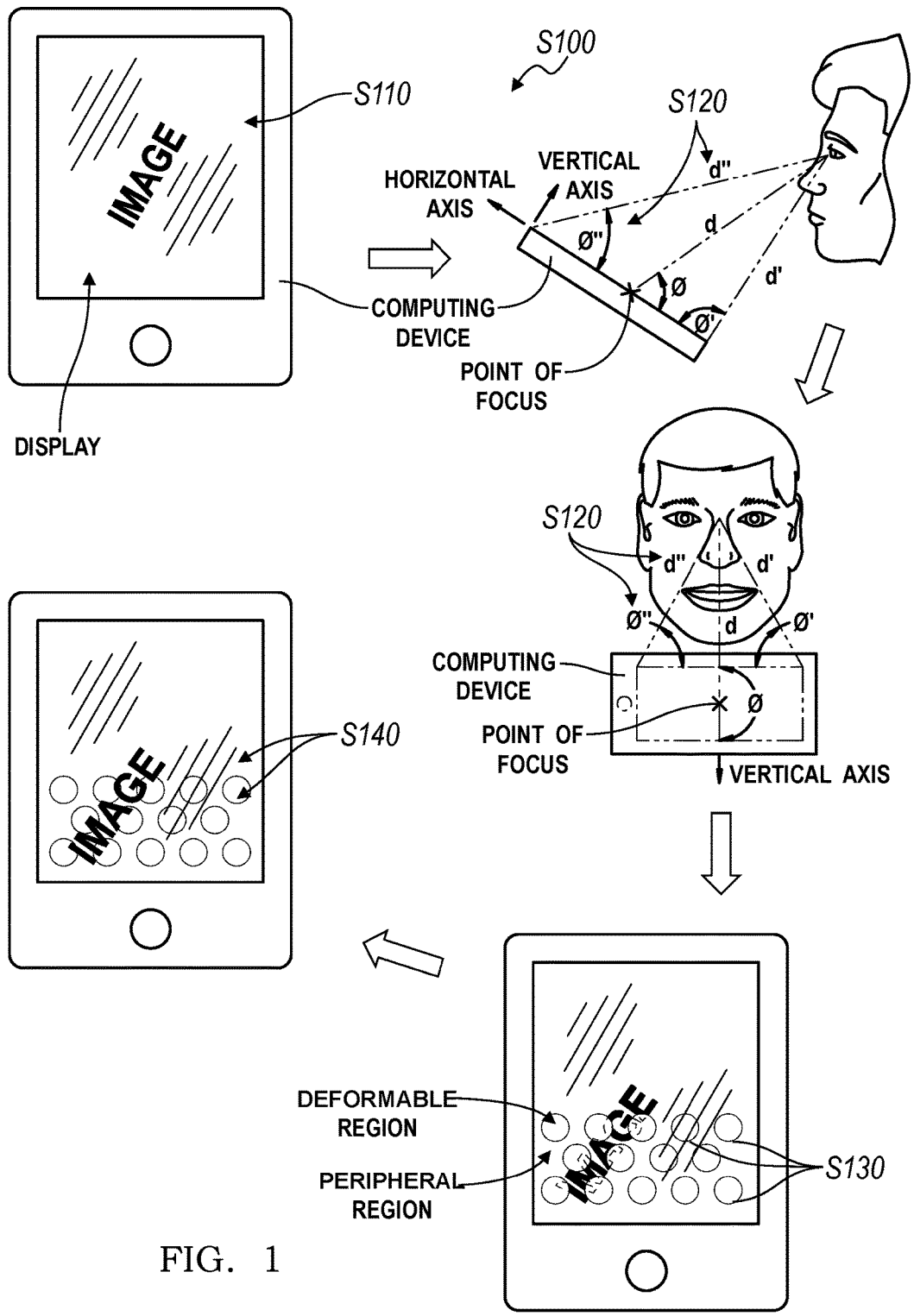
FIG. 1 is a flowchart representation of a method of one embodiment of the invention.

As shown in FIG. 1, a method S100 for reducing perceived optical distortion of light output through a dynamic tactile interface includes: rendering an image on a digital display in Block S110. The digital display is coupled to a substrate opposite a tactile layer, the substrate and tactile layer are substantially transparent, and the tactile layer defines a tactile surface, a deformable region, and a peripheral region. The peripheral region is adjacent the deformable region and is coupled to the substrate opposite the tactile surface. The deformable region is disconnected from the substrate and is operable between a retracted setting and an expanded setting, the tactile surface at the deformable region substantially flush with the tactile surface at the peripheral region in the retracted setting and offset from the tactile surface at the peripheral region in the expanded setting. The method S100 further includes: estimating a viewing position of a user relative to the digital display in Block S120; transitioning the deformable region from the retracted setting into the expanded setting in Block S130; and modifying the portion of the image rendered on the digital display according to the estimated viewing position of the user and a profile of the tactile surface across the deformable region in the expanded setting in Block S140.

Figure 5:
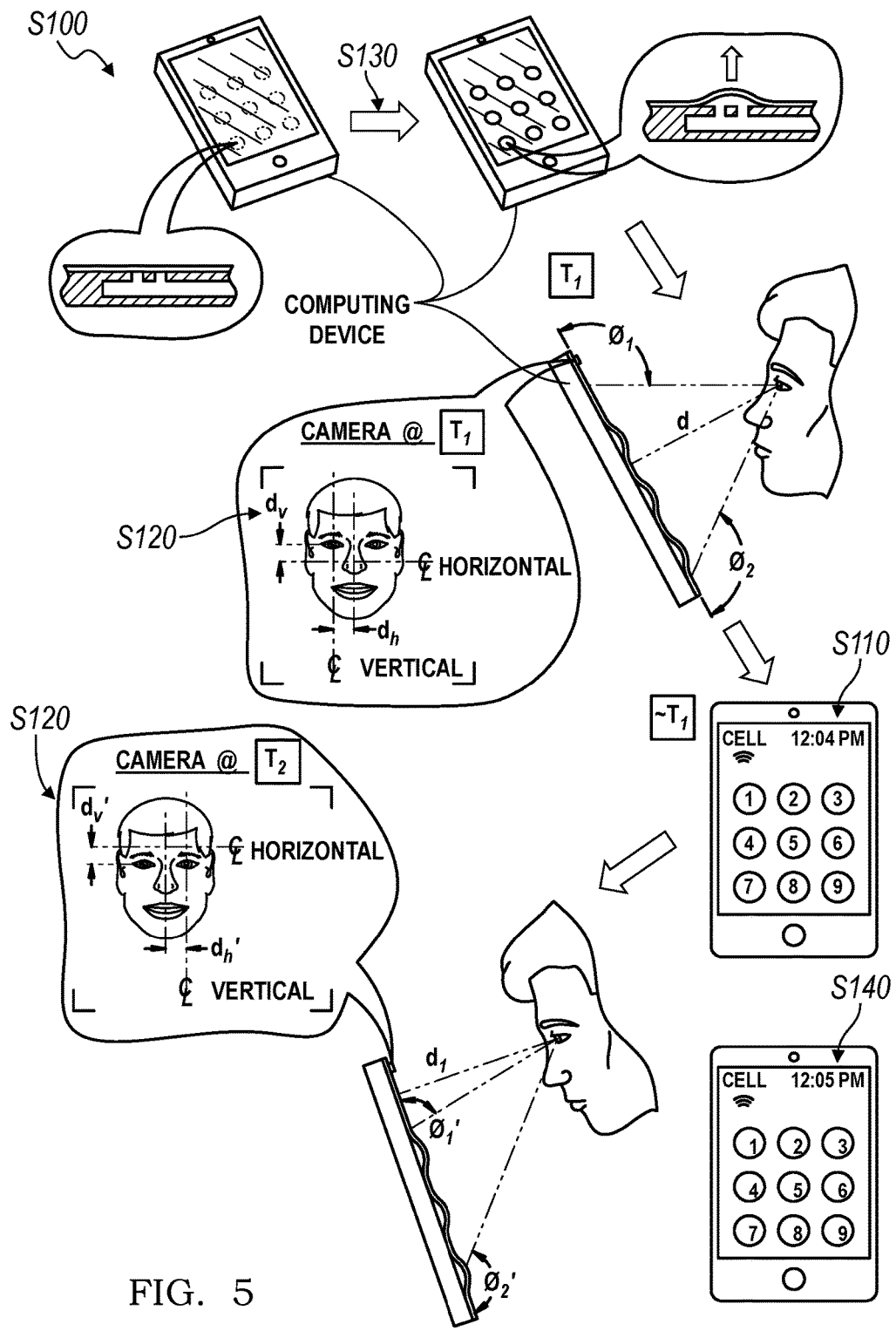
FIG. 5 is a flowchart representation of one variation of the method.

As shown in FIG. 5 one variation of the method S100 includes transitioning the deformable region from a retracted setting into an expanded setting in Block S130, the tactile surface offset above the tactile surface at the peripheral region in the expanded setting; at a first time, estimating a first viewing position of a user relative to the digital display in Block S120; substantially at the first time, rendering a image on the digital display based on the first viewing position and a profile of the tactile surface across the deformable region in the expanded setting, the image including a portion rendered on the digital display adjacent the deformable region in the expanded setting in Block S110; at a second time succeeding the first time, estimating a second viewing position of the user relative to the digital display in Block S120; and modifying a position of the portion of the image rendered on the digital display adjacent the deformable region based on a difference between the first viewing position and the second viewing position in Block S140.

2. Applications and Dynamic Tactile Interface

Figure 2:
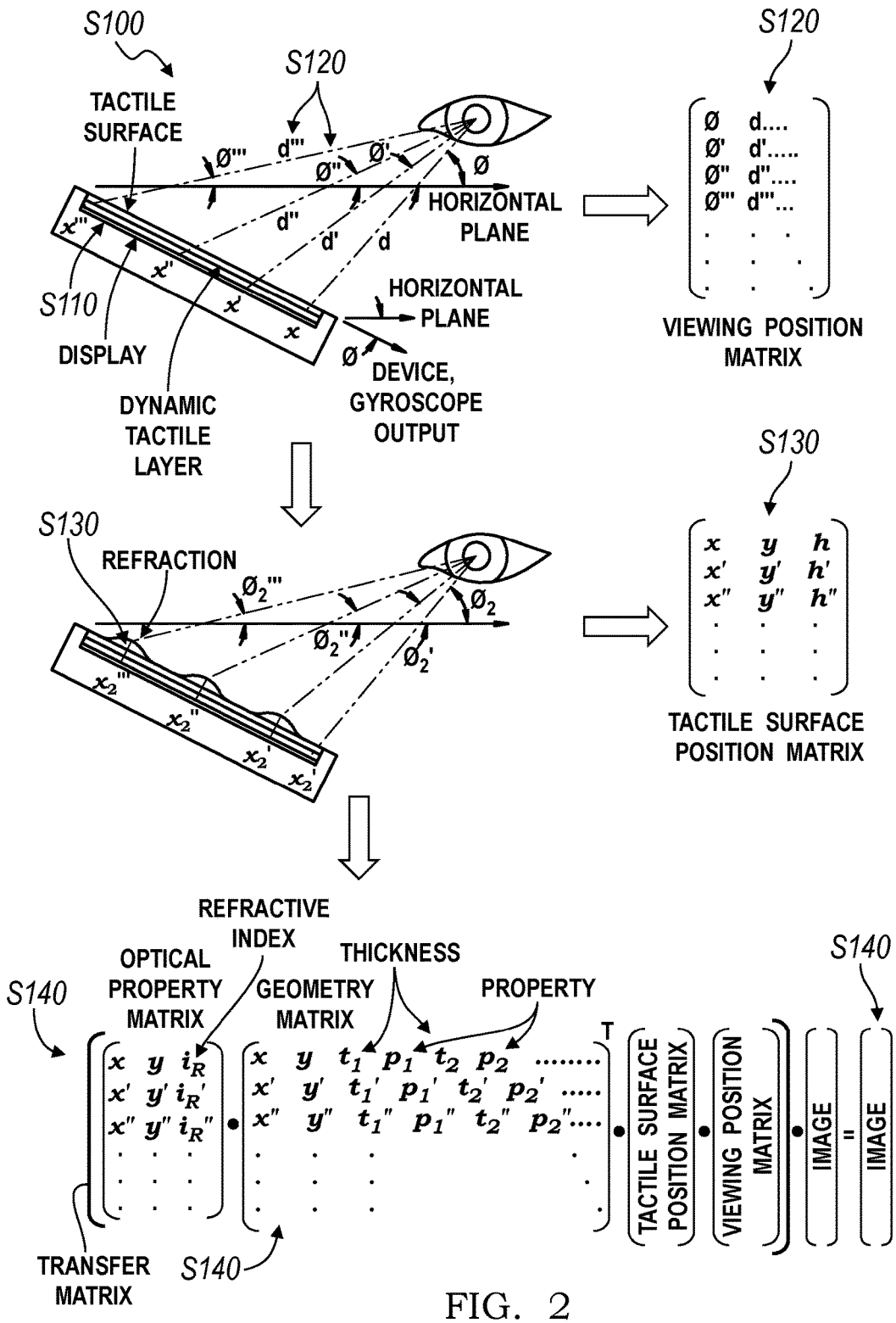
FIG. 2 is a flowchart representation of one variation of the method.

As shown in FIG. 2, the method S100 functions to reduce a user's perceived optical distortion of an image rendered on a digital display, such as resulting from reconfiguration of one or more deformable regions of a dynamic tactile interface arranged over the digital display, based on a predicted or estimated viewing position of the user to the digital display.

The method S100 can therefore be implemented on a computing device incorporating a dynamic tactile interface described in U.S. patent application Ser. No. 11/969,848, filed on 4 Jan. 2008, in U.S. patent application Ser. No. 12/319,334, filed on 5 Jan. 2009, in U.S. patent application Ser. No. 12/497,622, filed on 3 Jul. 2009, in U.S. patent application Ser. No. 12/652,704, filed on 5 Jan. 2010, in U.S. patent application Ser. No. 12/652,708, filed on 5 Jan. 2010, in U.S. patent application Ser. No. 12/830,426, filed on 5 Jul. 2010, in U.S. patent application Ser. No. 12/830,430, filed on 5 Jul. 2010, which are incorporated in their entireties by this reference. For example, the method S100 can be implemented on a smartphone, tablet, mobile phone, personal data assistant (PDA), personal navigation device, personal media player, camera, watch, and/or gaming controller incorporating a dynamic tactile interface. The method S100 can additionally or alternatively be implemented on an automotive console, desktop computer, laptop computer, television, radio, desk phone, light switch or lighting control box, cooking equipment, a (dashboard) display within a vehicle, a commercial display, or any other suitable computing device incorporating a dynamic tactile interface. The digital display can include a touchscreen configured to both output an image and to detect an input, such as by a finger or by a stylus. Alternatively, the computing device can include the digital display that is a discrete display coupled to a touch sensor, such as an optical, capacitive, or resistive touch sensor.

In particular, the method S100 can be implemented on a computing device that includes a digital display coupled to a substrate opposite a tactile layer, and the method S100 can interface with a displacement device to displace a volume of fluid from a reservoir into a cavity adjacent a deformable region of the tactile layer (e.g., Block S130), thereby expanding the cavity and transitioning the deformable region into an expanded setting. In the expanded setting, the tactile surface at the deformable region is thus elevated above the tactile surface at the peripheral region such that an effective thickness of the tactile layer across the deformable region exceeds an effective thickness of the tactile layer across the peripheral region of the dynamic tactile interface.

The substrate, the tactile layer, and the volume of fluid (from hereon after the "dynamic tactile layer") can each be substantially transparent such that images (or "frames") rendered on the digital display can be visible to a user through the substrate, tactile layer, and fluid arranged over the digital display. However, the substrate, the tactile layer, and the fluid can each exhibit a refractive index that differs from that of air such that expansion of one or more deformable regions into expanded settings yields variations in thickness across the dynamic tactile layer and thus non-uniform distortion (e.g., refraction) of light output from the digital display through the dynamic tactile layer. In particular, transition of a deformable region of the dynamic tactile layer from the retracted setting into the expanded setting can cause a user to visually detect optical distortion of an image rendered on the digital display, and the method S100 can therefore modify an image rendered on the digital display prior to transition of the deformable region into the expanded setting to reduce a user's perceived optical distortion of the image once the deformable region enters the expanded setting. The method S100 can also systematically (e.g., cyclically) refresh the digital display with modifications of the image to compensate for a dynamically changing profile of the dynamic tactile layer throughout transition of the deformable region from the retracted setting into the expanded, and vice versa.

Furthermore, a user's viewing position relative to the digital display (e.g., the user's viewing angle to and/or viewing distance from the digital display) can dictate how light output through the dynamic tactile layer is perceived by the user, and the user's viewing position relative to the digital display can change over time as the user interacts and interfaces with the computing device such the perceived distortion of light through the dynamic tactile layer changes dynamically during such time. The method S100 can therefore modify (e.g., refresh, update) an image rendered on the digital display to compensate for a change in the user's viewing position relative to the digital display, such as when one or more deformable regions of the dynamic tactile layer is in the expanded setting or is transitioning between the expanded and retracted settings.

In particular, the method S100 can modify an image and/or refresh the digital display within the computing device to reduce or limit perceived light scattering effects, perceived internal reflection of regions of the image, perceived refraction and/or diffraction of the image, perceived directional or preferential light transmission or emission through the substrate (e.g., in favor of more uniform scattering, diffraction, reflection, and/or refraction of light), perceived chromatic dispersion of light transmitted through the dynamic tactile layer, and/or other perceived optical distortions of parallax effects of the displayed image. The method S100 can therefore predict (or estimate) a user viewing position (in Block S120), control a vertical position (e.g., height) of a deformable region (in Block S130), and modify the image displayed on the digital display (in Block S140)—based on the predicted user viewing position and the current position of the deformable region—to reduce and/or minimize optical distortion of the image output by the digital display as perceived by the user. In one example, the method S100 linearly stretches the image—rendered on the digital display—horizontally and/or vertically about a predicted point of focus of the user on the digital display. In another example, the method S100 translates (i.e., shifts laterally or vertically on the digital display) a subregion of the image adjacent (e.g., lying under) a deformable region based on an angle and distance of the user to the deformable region or to the digital display. In yet another example, the method S100 linearly or nonlinearly scales (i.e., alters a size of) a subregion of the image adjacent the deformable region to offset preferential magnification of the subregions of the image by the adjacent deformable region in the expanded setting.

In addition to the position of a deformable region and the user's angle and/or distance from the digital display, the method S100 can additionally or alternatively account for (average) refractive indices, wavelength-specific refractive indices, Abbe numbers, chromatic dispersion of different wavelengths of light, and/or other optical properties of materials within the dynamic tactile interface and/or the digital display to dictate compensation of optical distortion of all of a portion of the image rendered on the digital display. The method S100 can also account for mechanical properties of materials of the dynamic tactile interface, a thickness of a cover glass of the digital display, colors and/or a brightness of the rendered image, a thickness or other geometry of the substrate, tactile layer, and/or deformable regions(s), a gap between the digital display and the substrate, an orientation of the digital display relative to the user, and/or a shape and/or height of a deformable region, a change in thickness across the deformable region of the tactile in between expanded and retracted settings, etc. to dictate compensation of optical distortion of all of a portion of the image rendered on the digital display, such as to limit, reduce, and/or substantially eliminate optical distortion of the displayed image as perceived by a user. Therefore, the method S100 can adjust regions of a displayed image based on viewing position of the user to the digital display, optical properties, mechanical properties, and geometries of components of the computing device, and a three-dimensional profile (e.g., shape) of one or deformable regions across the tactile layer of the dynamic tactile interface.

As described above, the method S100 can repeat systematically to accommodate changes in the user's viewing position relative to the digital display and/or changes in the position of one or more deformable regions over time. In one example implementation, the method S100 estimates or measures a new position of a deformable region (such as described in U.S. patent application Ser. No. 13/896,090, filed on 16 May 2013, which is incorporated in its entirety by this reference), executes a process to estimate (e.g., predict, calculate) the viewing position of the user at a refresh rate, generates a new (or updates an existing) transfer matrix for modifying the image based on the new position of the deformable region and the predicted viewing position of the user, and applies the transfer matrix to the image and renders the updated image on the digital display at the refresh rate. The method S100 can therefore update the image substantially in real-time by cyclically capturing and implementing new user viewing position and/or deformable region position data. In another example implementation, the method S100 generates and applies a new (or update an existing) transfer matrix to the displayed image in response to a change in the predicted user viewing distance that exceeds a threshold distance change (e.g., more than 0.5") and/or in response to a change in predicted user viewing angle that that exceeds a threshold angle change (e.g., more than 5°). In a similar example implementation, the method S100 generates and applies a new (or update an existing) transfer matrix to the displayed image in response to a setting change of one or more deformable regions, such as if a deformable region transitions from the expanded setting to the retracted setting, transitions from the retracted setting to the expanded setting, or transitions into an intermediate position between the retracted and expanded settings. However, the method S100 can update or modify the image rendered on the digital display in response to any other trigger(s) and/or threshold event(s).

3. Image

Block S110 of the method S100 recites rendering an image on a digital display. Generally, Block S110 functions to render an (initial) image on the digital display, such as when the deformable region is in the retracted setting. In one example, the tactile surface at the deformable region can be substantially flush (i.e., in plane) with the tactile surface at the peripheral region in the retracted setting, and Block S110 can control the digital display within the computing device to render a stock (i.e., standard, unadjusted) image on the digital display. Thus, in this example, Block S130 can expand the deformable region to elevate the tactile layer at the deformable region to a position offset above the peripheral region, and Block S140 can update the digital display to render a new or adjusted image that compensates for optical effects of the deformable region in the expanded setting. In an alternative example, the tactile surface at the deformable region is arranged at a first position above the tactile surface at the peripheral region in the expanded setting, and Block S110 outputs a first adjusted image that compensates for optical irregularities across the dynamic tactile layer stemming from a difference in effective thickness of the dynamic tactile layer across the peripheral region and the deformable region. In this alternative example, Block S130 can expand the deformable region to a second position further elevated above the tactile layer at the peripheral region, and Block S140 can update the digital display to render an adjusted image that compensates for different optical effects of the deformable region in the expanded setting. In a similar alternative example, the tactile surface at the deformable region can be retracted below the tactile surface at the peripheral region in the retracted setting, and Block S110 can output a first adjusted image that compensates for optical distortion of the digital display resulting from the concave form of the tactile surface across the retracted deformable region. In this example, Block S130 can expand the deformable region into a position offset above the deformable region in the retracted setting, such as flush with or offset above the peripheral region, and Block S140 can output a second adjusted image that compensates for non-uniform transmission of light through the dynamic tactile layer across the peripheral region and the deformable region in the expanded setting.

As described in U.S. patent application Ser. No. 12/319,334, the dynamic tactile interface can include the tactile layer that defines a peripheral region and a deformable region, the peripheral region adjacent the deformable region and coupled to the substrate opposite a tactile surface. The deformable region can also cooperate with the substrate to define a cavity, a displacement device can be coupled to the cavity via a fluid channel defined within the substrate, and actuation of the displacement device can pump fluid into and out of the cavity to expand and retract the deformable region, respectively. As described in U.S. patent application Ser. No. 12/319,334, the dynamic tactile interface can also include multiple deformable regions that can be transitioned between retracted and expanded settings in unison and/or independently, such as through actuation of various valves arranged between one or more displacement devices and one or more cavities and/or fluid channels.

In one implementation, the dynamic tactile interface includes an array of deformable regions patterned across the digital display in a keyboard arrangement. In one example of this implementation, Block S110 controls the digital display to render an initial image of a home screen for a smartphone incorporating the dynamic tactile interface when each deformable region of the dynamic tactile layer is set in the retracted setting. In this example, once a user selects a native text-input application (e.g., a native SMS text messaging application, an email application, a calendar application, a web browser applications including a search bar), Block S110 controls the digital display to render a new image of an interface including a 26-key virtual alphanumeric keyboard at a first time, Block S130 transitions a set of deformable regions—each arranged over and aligned with a key of the virtual keyboard—into the expanded setting over a period of time (e.g., two seconds) following the first time, and Block S140 modifies the position (and size) of one or more displayed keys (based on the user's viewing position) to mitigate perceived misalignment of the keys due to an effective variation in thickness of the tactile layer across the deformable regions.

In another example of the foregoing implementation, the method S100 is implemented through a road vehicle including a console display and a dynamic tactile interface arranged over the console display. In this example, once a user turns the vehicle on, Block S110 controls the console display to render an image of a virtual stereo control interface including multiple stereo control keys (e.g., volume, play, track forward, rewind, saved radio stations, etc.), and Block S130 controls a displacement device to transition a set of deformable regions—each substantially aligned with a virtual key of the virtual stereo control interface rendered on the digital display—within the dynamic tactile layer into the expanded setting. In this example, Block S130 interfaces with one or more cameras arranged within the vehicle to track the eyes of occupants of the vehicles, including when and from what position within the vehicle an occupant looks at the console display, and Block S140 modifies the position of one or more virtual keys rendered on the digital display to improve the perceived alignment of each virtual key with a corresponding deformable region for occupants of the vehicle look directly at the console display. In this example, Block S140 can prioritize modification of the rendered image of the virtual stereo control interface, such as by prioritizing modification of the image for the driver of the vehicle first, then a front-row passenger of the vehicle, and then rear-seat passengers of the vehicle, etc.

Block S110 can therefore interface with the digital display to render the initial image on the digital display. For example, Block S110 can execute on a display driver controlling the digital display or on a processor electrically coupled to the digital display driver within the computing device. Block S110 can output the initial image that defines a complete display area of the digital display, such as by assembly the initial image from icons, stock frames, digital still photographs, text, stock borders, and/or stock figures, etc. Block S110 can also generate the initial image including virtual input regions that visually demarcate one or more input-sensitive regions of a touchscreen (e digital display with an integrated touch sensor) that renders the initial image, and Block S110 can place the virtual input regions within the initial image such that the virtual input regions substantially align with corresponding deformable regions of the dynamic tactile interface in the retracted setting. In one example and as described above, Block S110 can control a touchscreen integrated with the computing device to display a set of virtual alphanumeric keys (e.g., A, B, C, . . . , X, Y, Z) that define an alphanumeric keyboard such that an input on the tactile surface (arranged over the touchscreen) over a particular virtual alphanumeric key triggers input of a corresponding alphanumeric symbol into the computing device. In another example, Block S110 can interface with the digital display a render an image of a home screen with a set of icons, each icon in the set of icons corresponding to a native applications installed on the computing device (e.g., smartphone) and displayed adjacent a corresponding deformable region.

As described above, Block S110 can control the digital display to render a 'standard' image for a dynamic tactile interface with a flush and continuous tactile surface (e.g., for the dynamic tactile interface with all deformable region in the retracted setting), the standard image not adjusted to compensate for a user's perceived optical distortion due to a substantially uniform effective thickness of the dynamic tactile layer that yields substantially uniform optical distortion of the image broadcast through the dynamic tactile layer.

Alternatively, Block S110 can implement one or more methods or techniques described below to adjust the initial image based on the user's viewing position relative to the computing device, such as when the tactile surface at the deformable region is offset from the tactile surface at the peripheral region in the retracted setting and/or while the deformable region transitions into the expanded setting. For example, Block S120 can execute prior to or in conjunction with Block S110 to predict a viewing position of a user relative to the digital display, and Block S110 can implement methods or techniques as in Block S140 described below to transform a 'standard' image into an initial modified image that compensates for optical distortions precipitated by a non-uniform surface profile of the tactile surface (in the retracted setting) based on the predicted viewing position of the user. However, Block S110 can function in any other way to render (or to interface with a digital display to render) an image on a digital display coupled to a substrate opposite a tactile layer.

4. Optical Distortion

Generally, given a first imaginary line extending from a first point (e.g., a first pixel) on the digital display normal to (a dominant face of) the digital display and bisecting a line between the user's eyes, the user may perceive the first point projected through the dynamic tactile layer without substantial optical distortion. Specifically, the angle of incidence of light output from the digital display—through the dynamic tactile layer—to the user is approximately 0° at the first point, and the angle of refraction of this light output from the first portion of the digital display is approximately 0°, as indicated by Snell's law, which recites $$\frac{\sin\theta_1}{\sin\theta_2} = \frac{v_1}{v_2} = \frac{n_2}{n_1}$$

wherein each θ defines an angle measured from a normal boundary between the digital display and the dynamic tactile layer (or between the dynamic tactile layer and air), wherein each v represents a velocity of light through the respective medium in meters per second, and wherein n defines a refractive index of the respective medium.

However, for a second point (e.g., second pixel) on the digital display offset from the first point, a second imaginary line extending from the second point to a center of the line between the user's eyes may not be normal to the dominant face of the digital display. Specifically, the angle of incidence of light output from second point of the digital display—through the dynamic tactile layer—to the user is non-zero (i.e., greater than 0°) in at least one of two planes perpendicular to the plane of the dominant face of the display. Therefore, light output from the second point of the digital display may refract (i.e., bend) across the junction between the digital display and the dynamic tactile layer and again across the junction between the dynamic tactile layer and air (e.g., at the tactile surface), thereby shifting a perceived position and/or light intensity of the second point on the digital display relative to the first point for the user. Furthermore, a thickness of the dynamic tactile layer over the second point of the digital display can affect a total distance between the actual second point of the digital display and the perceived position of the second point for the user. In particular, the offset between the real and perceived position of the second point can be directly proportional to a thickness of the dynamic tactile layer over (and around) the second point. Therefore, as the deformable regions with the dynamic tactile layer transition from the retracted setting into the expanded setting (or between other settings) and the effective thickness of the dynamic tactile layer becomes non-uniform over its breadth, refraction of light through the dynamic tactile layer also becomes non-uniform, thereby yielding distortion of an image rendered on the digital display as offsets between real and perceived position of points across the rendered image vary. For example, a user may perceive greater optical distortion of light output from a third point on the digital display, the third point at a distance from the first point greater than a distance between the first point and the second point.

Furthermore, light output from the digital display proximal the second point may exhibit greater internal reflection than light output from the digital display proximal the first point, thereby resulting in perceived lower intensity of light output at the second point compared to light output at the first point. Varying thickness of the dynamic tactile layer across its breadth due to expansion of one or more deformable regions may further yield non-uniform internal reflection of light output from the digital display and thus perception of non-uniform light intensity across the display. Similarly, a surface roughness of the tactile surface across a deformable region may be affected by a position of the deformable region, such as particularly along a junction between the deformable region and an adjacent peripheral region of the tactile surface, which may change how the tactile layer scatters and/or diffuses light transmitted through the tactile layer. Diffusion of light through the tactile layer may also be dependent on an angle of incidence of light—output from the display—onto a boundary between the display and the substrate and/or onto a boundary between the substrate and the tactile layer.

Light output from the digital display proximal the second point may also exhibit greater chromatic dispersion or other optical effects than light output from the digital display proximal the first point, resulting in further perceived optical distortion of the second point compared to the first point. In particular, the substrate, the fluid, the tactile layer, the display, and/or air may exhibit difference indices of refractions for light across the visible spectrum such that light transmitted from the digital display through the dynamic tactile layer may bend by different degrees for various wavelengths the light, thereby separating light output from the digital display by wavelength. Such effect may be substantially minimal across planar regions of the tactile surface but may be relatively significant and perceptible at a junction between a peripheral region and a deformable region.

Therefore, differences between average and/or wavelength-specific refractive indices of various materials of the dynamic tactile interface and the digital display, geometries (e.g., thicknesses) of and offsets between materials within the dynamic tactile layer and the display, orientation of the components of the dynamic tactile layer and the digital display (e.g., orientation of pixels in the digital display relative to a fluid channel within the dynamic tactile layer), etc. can yield non-uniform chromatic dispersion of different wavelengths of light output from the digital display and variations in degree and/or type of perceived optical distortion of light emitted across the digital display.

In one implementation, the method S100 models (or predicts, estimates) a user's perception of optical distortion of light emitted from each particular point (e.g., pixel or group of pixels) on the digital display based on an angle(s) and a distance from the user's eyes to each particular point on the digital display. For example, the method S100 can select a particular point on the digital display through which a line normal to the dominant face of the digital display can be drawn to the (center of the) user's eyes and define this particular point as a point of minimal perceived optical distortion of the digital display on the digital display and set this particular point as an anchor point. In this example, the method S100 can then apply a known geometry (e.g., width, length) of the digital display and/or of the dynamic tactile interface to estimate an angle and a distance of the user's eyes to each other point across the digital display (such as based on an orientation of the computing device) and to model perceived optical distortion of light emitted from these points according to these angles, these distances, and a current profile of the tactile surface. As described below, Block S140 (and Block S110) can thus implement such information to modify the displayed image to reduce perceived optical distortion of the image rendered across the digital display.

Furthermore, a shape and/or height (e.g., vertical position, internal or external radius of curvature) of a deformable region of the tactile layer can also affect types of optical distortion (i.e., reflection, refraction, diffraction, chromatic dispersion, etc.) that occur across the dynamic tactile layer by locally altering an effective thickness to the dynamic tactile layer and/or by introducing new material (e.g., fluid) into the dynamic tactile layer. As described below, Block S140 can further modify the image rendered on the digital display according to a known position, shape, height, etc. of one or more deformable regions of the tactile layer to reduce perception of non-uniform optical distortion across the deformable region(s). For example, Block S140 can implement one or more techniques described in U.S. patent application Ser. No. 13/896,090 to detect a height and/or shape of a deformable region based on an output of a capacitive touch sensor coupled to the dynamic tactile layer. Block S140 can also modify an image rendered on the digital display according to optical properties of the fluid, optical properties of the tactile layer under different strains or deformations, etc. to render an image—which yields a reduced perception of optical distortion by the dynamic tactile layer—on the display.

Therefore, perceived optical distortion of an image rendered on the digital display can be dependent on an angle between the user's eyes and points across the digital display, a distance from the user's eyes to the points across the digital display, and/or an orientation of the digital display relative to the user. Block S110 can therefore function to render an initial image, Block S120 can function to collect, predict, and/or estimate user eye position data, Block S130 can function to control a profile of the tactile surface of the dynamic tactile layer, and Block S140 can function to update or modify the image based on (a change in) the position of the user and/or (a change in) the profile of the tactile surface to compensate for changes corresponding actual or perceived changes in refraction, diffraction reflections, etc. of light output from the display.

5. Viewing Position

Block S120 of the method S100 recites estimating a viewing position of a user relative to the digital display. Block S120 functions to detect an angle (e.g., in each of two lanes) and/or a distance of the user's eyes to one or more points on the digital display, such as to each pixel or cluster of adjacent pixels of the display. Block S120 can also detect the user's point of focus on the digital display, the orientation of the computing device (and the dynamic tactile interface) relative to the user's eyes or to gravity, etc.

In one implementation, Block S120 interfaces with a forward-facing camera adjacent the digital display within the computing device to capture (or retrieve) a photographic image of the user viewing the digital display, and Block S120 further implement machine vision (e.g., objection recognition) and/or machine learning techniques to identify the user's eyes in the photographic image. Once the user's eyes (or pupils, cheekbones, eyelids, and/or eyebrows, etc. or an outline of the user's head, etc.) are identified in the photographic image, Block S120 can estimate a real distance between the user's eyes and the camera. For example, Block S120 can count a number of pixels between the centers of the user's pupils as shown in the photographic image, predict a real pupil center distance of the user, and calculate a real distance from the camera to the user's eyes based on the number of pixels between the user's pupils and the predicted real pupil center distance of the user, such as according to a parametric function specific to the camera arranged within the computing device. In this example, Block S120 can process the photographic image of the user to detect an age, gender, and/or ethnicity, etc. of the user and then generate a prediction for the real pupil center distance of the user based on these data based on a parametric function, a lookup table, etc. Alternatively, Block S120 can apply a static (i.e., preset) estimated real distance between eyes of users to estimate the distance between the user's eyes and the camera. Yet alternatively, Block S120 can implement a standard viewing distance for the computing device to estimate the user's viewing position relative to the camera. For example, for the computing device that includes a smartphone (or other computing device with a display less than sixteen square inches in size), Block S120 can apply a typical viewing distance of twelve inches between a user's eyes and a surface of the smartphone in determining the user's viewing position. In another example, for the computing device that includes a tablet (or other computing device with a display between sixteen and 100 square inches in size), Block S120 can apply a typical viewing distance of fifteen inches between a user's eyes and a surface of the smartphone in determining the user's viewing position. In yet another example, for the computing device that includes a laptop (or other computing device with a display between 100 and 200 square inches in size), Block S120 can apply a typical viewing distance of eighteen inches between a user's eyes and a surface of the smartphone in determining the user's viewing position. However, Block S120 can function in any other way to calculate, predict, or estimate a distance between the user's eyes and the camera (or digital display or other surface) of the computing device.

Figure 3:
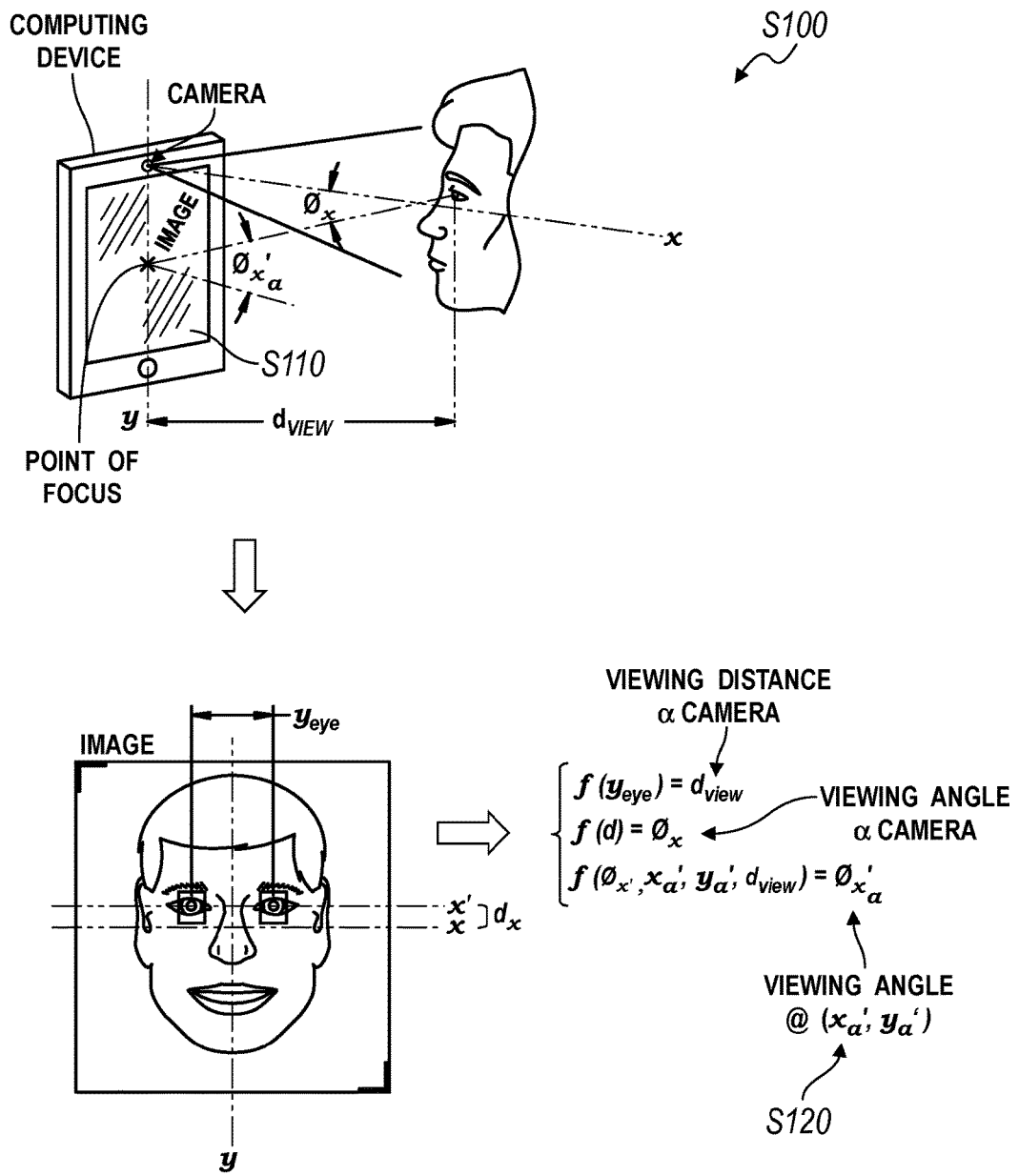
FIG. 3 is a flowchart representation of one variation of the method.

In this implementation, Block S120 can also estimate (e.g., calculate, extrapolate) an angle between the user's eyes and the camera along one or more axes based on a location of the user's eyes within the image. For example, Block S120 can (effectively) apply a virtual crosshatch centered on the photographic image (and corresponding to perpendicular centerlines of a lens of the camera), and Block S120 can determine that the user's viewing angle is 0° about a horizontal axis of the camera if a virtual horizontal centerline extending across the user's pupils within the photographic image lies substantially over a horizontal line of the virtual crosshatch, and Block S120 can determine that the user's viewing angle is 0° about a vertical axis of the camera if a vertical centerline centered between the user's pupils within the photographic image lies substantially over a vertical line of the virtual crosshatch, as shown in FIG. 3.

However, as in this implementation, Block S120 can also determine one or more non-normal viewing angles of the user relative to the camera. For example, Block S120 can also interface with a gyroscope and/or accelerometer within the computing device (shown in FIG. 2) to determine a current orientation of the computing device, such as if the computing device is currently held in a portrait orientation or a landscape orientation. Alternatively, Block S120 can implement any suitable machine vision technique to identify a second feature of the user's face (e.g., a mouth, a nose, eyebrows, a chin, etc.) in the photographic image and to determine an orientation of the camera (and therefore to the computing device) relative to the user based on a common relation (i.e., position) between eyes and the second feature on a human face. Block S120 can then implement this orientation of the camera relative to the user to determine that the user's viewing angle about the horizontal axis of the camera is less than 0° if the virtual horizontal centerline extending across the user's pupils within the photographic image lies below the horizontal line of the virtual crosshatch applied to the photographic image and that the user's viewing angle about the horizontal axis of the camera is greater than 0° about the horizontal axis if the centerline between the user's pupils lies above the horizontal line of the virtual crosshatch of the photographic image. Therefore, Block S120 can estimate the pitch of the user relative to a center point of the camera and about a horizontal axis of the camera based on a position of the user's eyes within a photographic image captured by a camera within the computing device.

Block S120 can also determine the user's viewing angle about the vertical axis of the camera. For example, Block S120 can implement the detected orientation of the camera relative to the user to determine that the user's viewing angle about the vertical axis of the camera is less than 0° if the virtual vertical centerline between the user's pupils within the photographic image lies to the right of the vertical line of the virtual crosshatch applied to the photographic image, and Block S120 can determine that the user's viewing angle about the vertical axis of the camera is greater than 0° if the centerline between the user's pupils lies to the left of the vertical line of the virtual crosshatch in the photographic image. Therefore, Block S120 can estimate the yaw of the user relative to the center point of the camera and about a vertical axis of the camera based on a position of the user's eyes within the photographic image.

Therefore, as in this implementation, Block S120 can estimate angles between the user's eyes and the camera along two perpendicular axes based on the position of the user's eyes within a photographic image, as shown in FIG. 1

Block S120 can also set positive and negative directions for the user's viewing angle relative to the camera along the horizontal and vertical planes based on the orientation of computing device and/or the orientation of the user to the camera, and Block S120 can also define horizontal and vertical planes of the camera based on the orientation of computing device and/or the orientation of the user to the camera. For example, Block S120 can implement machine vision techniques, as described above, to identify the user's eyes and a second feature of the user within the photographic image of the user, detect a "roll" or angular position of the user relative to the camera based on the position of the eyes and the second feature of the user within the photographic image, and then define the horizontal and vertical planes of the camera according to the angular position of the user to the camera (i.e., not parallel to short and long sides of the computing device, an optical sensor within the camera, and/or the photographic image). Specifically, Block S120 can function as described above to detect an angular position of the user's eyes about an axis extending outward from (and normal to) the camera, and Block S120 can further define axes of the camera (and the computing device or the photographic image) according to the angular position of the user.

Block S120 can further transform the distance between the camera and the user's eyes, a known position of the camera relative to the digital display, the angle of the user's eyes about the horizontal axis of the camera, and/or the angle of the user's eyes about the vertical axis of the camera, etc. into user viewing angles at discrete positions (e.g., points, discrete areas) across the digital display. For example, as shown in FIG. 3, Block S120 can transform the user's viewing angles and distance from the camera into viewing angles (about perpendicular horizontal and vertical axes) at each pixel (or cluster of pixels) across the digital display. Therefore, Block S120 can generate a viewing position matrix defining an angle between the eyes of the user and the digital display along a first axis (e.g., the 'x' or horizontal axis) of the tactile layer over the digital display and an angle between the eyes of the user and the digital display along a second axis of the tactile layer for each discrete position in a set of discrete positions across the tactile layer based on a position of the eyes within the photographic image.

In another implementation, Block S120 can interface with a speaker within the computing device to output a low-frequency sound and then interface with a microphone within the computing device to receive reflected sounds originating from the speaker. Block S120 can then implement sonic imaging techniques to generate a virtual map of the user's facial futures (e.g., nose, eye sockets, forehead) and to estimate the angle and/or distance of the user's eyes to a reference point on the computing device (e.g., the microphone). Block S120 can then calculate the user's viewing angle (i.e., viewing position) relative to each pixel, group of pixels, or other regions across the digital display, such as based on known dimensions of the computing device, known dimensions of the digital display, and/or known dimensions of the dynamic tactile layer within the computing device. For example, Block S120 can generate a reference position matrix including the angle and/or distance of the user's eyes to the reference point on the computing device, cross the position matrix with a display region matrix (e.g., specifying the location of each pixel of the digital display relative to the reference point), and thus generate a viewing position matrix specifying viewing angles for each region of the digital display, shown in FIG. 2.

Block S120 can also implement eye-tracking methods to identify the user's current point of focus on the digital display. However, Block S120 can interface with any other component within, coupled to, or in communication with the computing device and can implement any other method or technique to determine the viewing position of the user relative to the digital display. Block S120 can also calculate the user's viewing position substantially in real-time and can update continuously—such as at a sampling rate of 10 Hz—to capture changes in the user's viewing position relative to the computing device (or to the digital display, to the dynamic tactile layer, and/or to the camera, etc.)

5. Deformable Region

Block S130 of the method S100 recites transitioning the deformable region from a retracted setting into an expanded setting. Generally, Block S130 functions to alter the position of one or more deformable regions of the dynamic tactile interface, thereby transiently creating a tactile formation across the tactile surface of the dynamic tactile layer (and over the digital display).

In one implementation in which the deformable region cooperates with the substrate of the dynamic tactile layer to define a cavity and in which the cavity is coupled to a displacement device via a fluid channel, Block S130 can control the displacement device (e.g., a positive displacement pump) to displace fluid from a reservoir, through the fluid channel, and into the cavity, thereby expanding the tactile layer at the deformable region to a offset above the tactile surface at the peripheral region. Block S130 can further interface with the displacement device (or with multiple displacement devices) to transition multiple deformable regions from the retracted setting to the expanded setting in unison, such as a set of deformable regions arranged over a virtual alphanumeric keyboard rendered on the digital display below to provide tactile guidance to the user as the user enters text into the computing device. Block S130 can therefore implement techniques and/or interface with components as described in U.S. patent application Ser. No. 13/481,676, filed on 25 May 2012, which is incorporated herein in its entirety by this reference.

In this implementation, Block S130 can control the displacement device to displace a preset volume of fluid into the fluid channel fluidly coupled to the cavity cooperatively defined by the substrate and the deformable region to expand the deformable region to a target height offset above the peripheral region. For example, Block S130 can displace 0.2 mL of fluid into the fluid channel to transition the deformable region to a known three-dimensional convex profile at a known maximum height above the peripheral region (e.g., 1.8 mm), such as at a known external radius of curvature. Block S130 can also track or measure a volume of fluid displaced into the dynamic tactile layer and then calculate a profile across the tactile surface based on this volume of fluid, an elasticity or other mechanical property of the tactile layer, and a known position and footprint of each expanded deformable region defined in the dynamic tactile layer. For example, Block S130 can implement a lookup table to access a stored surface profile model of the dynamic tactile layer based on a volume of fluid pumped into the dynamic tactile layer. In another example, Block S130 can execute a parametric model to calculate the profile across the tactile surface based on the foregoing parameters. Yet alternatively, Block S130 can interface with a capacitive touch sensor coupled to the dynamic tactile layer to detect a vertical position of discrete positions across the tactile layer, such as described in U.S. patent application Ser. No. 13/896,090.

However, Block S130 can function in any other way and can control any other component within the computing device to transition the deformable region from the retracted setting to the expanded setting and to monitor a profile of the tactile surface.

6. Image Modification

Block S140 of the method S100 recites modifying the portion of the image rendered on the digital display according to the estimated viewing position of the user and a profile of the tactile surface across the deformable region in the expanded setting. Generally, Block S140 functions to modify the image rendered on the digital display based on the viewing position of the user relative to (discrete positions across) the digital display and the profile of the tactile surface of the dynamic tactile layer to compensate for optical distortion of the image transmitted through the dynamic tactile layer to the user. In particular, Block S140 functions to modify the image to reduce the user's perception of distortion of the image rendered on the digital display.

As described above, differences in the indices of refraction of various materials of the dynamic tactile layer and the digital display and variations in the effective thickness of the dynamic tactile layer (i.e., between peripheral regions and deformable regions of the tactile layer) may yield optical distortion of an image rendered on the digital display across all regions of the digital display except a single point (i.e., pixel) in direct (i.e., normal) line of sight of the user. In particular, when the user views a ray of light—transmitted through the dynamic tactile layer—at an acute angle (i.e., a non-normal angle) between the user's eyes and the digital display, the user may perceive an origin (e.g., pixel) of the ray of light that is other than the true origin of the ray of light due to the thickness of the dynamic tactile layer that is arranged over the digital display. However, the distance between the true origin of a ray of light and the perceived origin of the ray of light may depend on an effective thickness of the dynamic tactile layer (and an effective thickness and material property of each of the substrate, fluid, and tactile layer of the dynamic tactile layer) such that the dynamic tactile layer with expanded deformable regions distorts an image rendered on the digital display. In one example, the tactile surface at the deformable region is substantially flush (i.e., in-plane) with the tactile surface at the peripheral region in the retracted setting, and the tactile surface at the deformable region is elevated (or offset) above the peripheral region when the deformable region transitions into the expanded setting. Thus, in the expanded setting, the deformable region can define a portion of the dynamic tactile layer of a (varying and) greater effective thickness relative to a portion of the dynamic tactile interface at the peripheral region. In this example, dissimilarity between the refractive index of materials of the dynamic tactile interface and air around the computing device can thus yield a greater distance between a perceived origin of a first ray of light and the true origin of the first ray of light transmitted through the deformable region in the expanded setting than for a second ray of light transmitted through the peripheral region for an equivalent viewing position of the user. For example, the dynamic tactile layer can exhibit a lensing effect locally across the deformable region in the expanded setting, thereby preferentially distorting light emitted from the digital display proximal the deformable region over light emitted from the digital display proximal the peripheral region. In particular, the user's viewing angle (and distance) to a region of the digital display (the "source") adjacent the deformable region (the "lens") can affect the user's perception of light emitted from the digital display (even if the user views the digital display at an angle of substantially co).

Furthermore, as described above, the deformable region can be transitioned to various heights above (and/or below) the peripheral region, and the height and shape (i.e., "profile") of the deformable region in the expanded setting can further affect distortion of light through the dynamic tactile layer and therefore the user's perception of an image rendered on the digital display.

Figure 4:
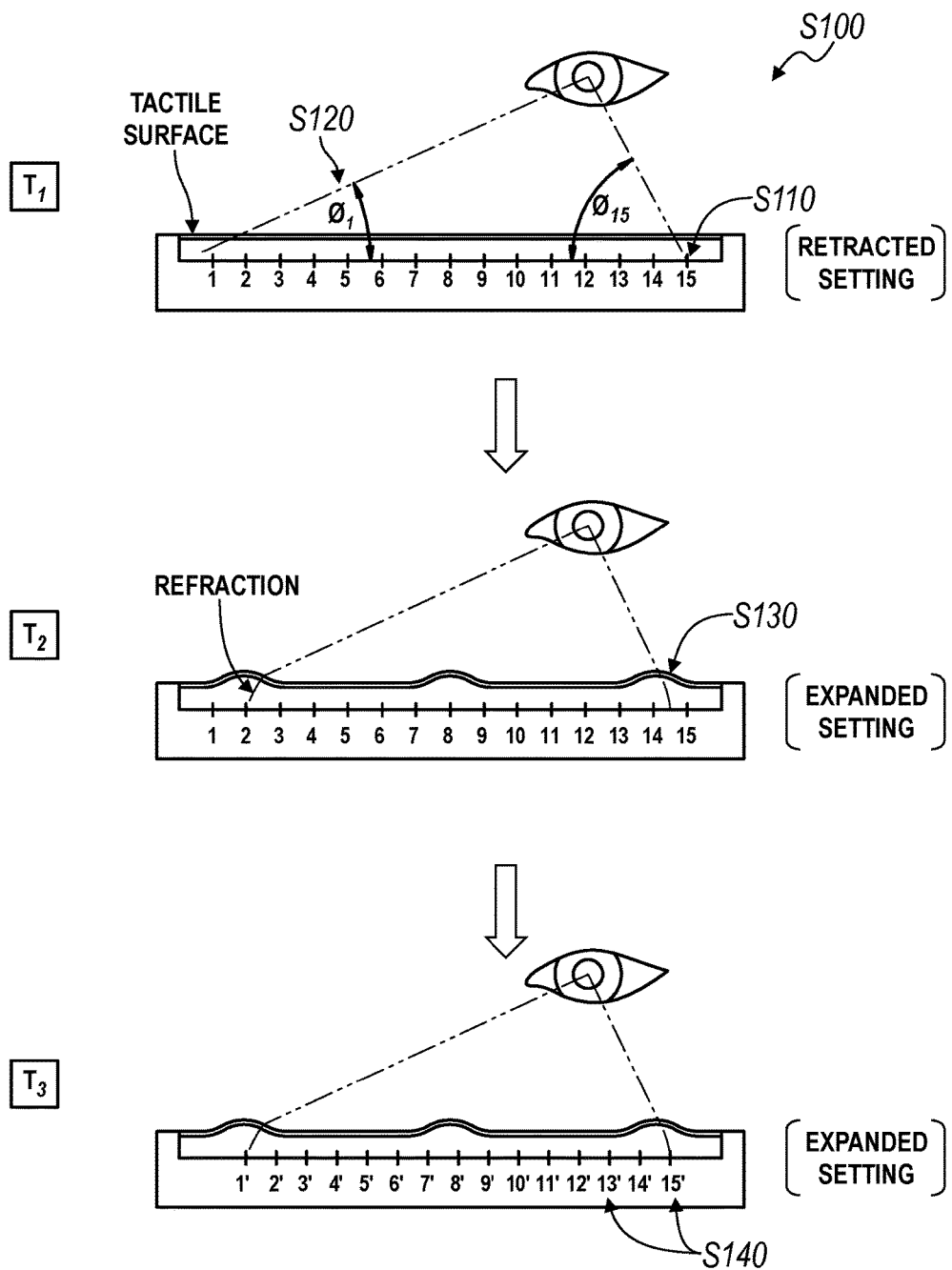
FIG. 4 is a flowchart representation of one variation of the method.

Therefore, in one implementation, Block S140 can modify the image rendered on the digital display (or render a second image based on the original image on the digital display) to compensate for a non-uniform optical distortion (e.g., refraction) of light transmitted through the dynamic tactile layer due to a change in the position of one or more deformable regions. For example, Block S140 can update the image as a deformable region of the dynamic tactile layer transitions from the retracted setting into the expanded setting to compensate for a local difference in optical distortion of light transmitted from the digital display to the user's eyes through the deformable region. In another example, Block S140 updates the image as a deformable region transitions from the expanded setting into the retracted setting to compensate for a return to more uniform optical distortion of light transmitted through the dynamic tactile layer. In another implementation, Block S140 can modify the image rendered on the digital display to compensate for a change in the user's viewing position relative to the digital display to compensate for non-uniform optical distortion of light transmitted through the dynamic tactile layer due to a non-uniform surface profile of the dynamic tactile layer. Block S140 can therefore update, modify, or replace an image rendered on the digital display in response to a change in position of a deformable region of the dynamic tactile layer and/or based on a change in a viewing position of the user relative to the digital display (when one or more deformable regions of the dynamic tactile layer is in a position other than flush with the peripheral region). Therefore, as in these implementations, Block S140 can translate and/or scale regions of the image rendered on the digital display, such as shown in FIG. 4, to offset optical effects resulting from light transmission through the dynamic tactile layer.

In one implementation, Block S110 displays a frame of a messaging application—including alphanumeric keys of an alphanumeric keyboard—on a digital display integrated into a computing device (e.g., a smartphone, a tablet, an other mobile computing device), and Block S120 determines that the user is holding the computing device in a landscape orientation based on an output of a gyroscope and/or accelerometer integrated into the computing device, sets a viewing center for the user at the effective center of the output surface of the digital display, and selects a preset user viewing distance of twelve inches from the output surface of the digital display. Block S130 then transitions select deformable regions of the dynamic tactile interface into the expanded setting, each of the select deformable regions adjacent an alphanumeric key rendered on the digital display, and Block S140 horizontally shrinks a portion of the rendered image corresponding to the alphanumeric keyboard with the portion of the image anchored at the effective center of the digital display and the magnitude of the horizontal expansion of the image corresponding to the user's viewing distance. For example, Block S140 can leave a first alphanumeric key proximal the user's viewing center in a substantially unchanged position in the second image, translate a second alphanumeric key laterally adjacent the first alphanumeric key horizontally away from the first alphanumeric key by a first distance in the second image, and translate a third alphanumeric key—laterally adjacent the second alphanumeric key opposite the first alphanumeric key—horizontally away from the second alphanumeric key by a second distance greater than the first distance in the second image. In particular, in this implementation, Block S140 can scale the image horizontally from an anchor point of the image that is set based on a preset (or predicted) user viewing center. Thus, in this implementation, Block S140 can adjust the image to accommodate predicted refraction effects of various deformable regions arranged across the digital display based on a static preset user viewing distance and/or user viewing center.

In the foregoing implementation, Block S120 can alternatively interface with a forward-facing camera integrated into the computing device to capture in photographic image, analyze the photographic image as described above to identify a user viewing distance relative to a reference point on the computing device. In the foregoing implementation, Block S140 can apply the predicted user viewing distance to set a horizontal scaling magnitude corresponding to the user's viewing distance and thus scale the image rendered on the digital display relative to a scaling anchor point (based on a predicted user viewing center) substantially in real-time. Block S140 can therefore apply a linear scaling (and/or or translation) value or a non-linear scaling (and/or or translation) model to the image to shift portions of the image to compensate for the user's viewing position relative to the dynamic tactile layer and the position of one or more deformable regions across the tactile surface.

As described above and shown in FIG. 3, Block S120 can further analyze the image to predict the user's viewing center (i.e., point of focus), such as by interfacing with a forward facing camera and implementing an eye tracking technique to analyze an output of the camera, and Block S140 can set a scaling anchor point at the user's point of focus on the digital display. Block S140 can thus modify a scaling magnitude and a scaling anchor point location substantially in real-time to accommodate changes in the user's viewing angle, distance, and/or point of focus relative to the digital display over time.

In another implementation, Block S140 can scale and/or transform only regions of the displayed image substantially adjacent a deformable region in an elevated position (i.e., in an expanded setting). For example, the tactile surface at the deformable region can define a three-dimensional convex domed geometry in the expanded setting, and Block S140 can translate a corresponding alphanumeric key displayed adjacent the deformable region such that a ray traced from the center of the corresponding alphanumeric key to the user's eyes (e.g., to the center of the bridge of the user's nose) passes through the deformable region normal to the tactile surface, such as shown in FIG. 4. In this example, Block S140 can translate a first region of the displayed image over a static second region of the image to substantially minimize perceived translation of the center of the first region optical due to a shift in the position of a deformable region adjacent the first region and/or due to a change in the user's viewing position. In this example, Block S120 can select a translation matrix defining viewing angles for various regions of the image for a current viewing angle and position of the user relative to a point on the computing device (e.g., relative to the camera, relative to a center of the digital display, relative to the user's viewing center or pint of focus), and Block S140 can implement the translation matrix to translate select portions of the image rendered on the digital display adjacent expanded deformable regions. Alternatively, Block S120 can select a translation matrix from a group of available translation matrices based on an orientation of the computing device, a user viewing angle, position, and/or point of focus (e.g., with predefined ranges) and/or settings of deformable regions of the dynamic tactile layer, etc., and Block S140 can implement the selected translation matrix to translate select portions of the image rendered on the digital display adjacent expanded deformable regions. Yet alternatively, Block S120 can generate a translation matrix based on an orientation of the computing device, a user viewing angle, a user viewing position, and/or a user point of focus, etc. (e.g., extrapolated from an output of a forward-facing camera), and Block S140 can implement the translation matrix accordingly. In particular, Block S140 can estimate a change in perceived position of a portion of the image, by the user, through the deformable region between the retracted setting and the expanded setting based on an estimated three-dimensional surface profile and the estimated viewing position of the user, can calculate a translation magnitude value and a translation direction to compensate for the change in perceived position of the portion of the image by the user, and can translate the portion of the image rendered on the digital display based on the translation magnitude value and the translation direction accordingly.

Block S140 can implement similar techniques to select and/or generate a scaling matrix for one or more regions of the displayed image. For example, as described above, the deformable region in the expanded setting can define a three-dimensional convex domed geometry—mimicking a lens—over a region of the digital display such that the deformable region magnifies an adjacent region of an image rendered on the digital display. In particular, the magnification power of the deformable region in the expanded setting can be based on the shape (e.g., the vertical height, perimeter geometry, attachment geometry, optical and mechanical material properties, etc.) of the deformable region, a distance between the tactile layer and an output surface of the digital display, and the user's viewing angle (and distance) to the deformable region, etc. Block S140 can thus accommodate for such variables to scale a portion of the region of the image adjacent the deformable region to compensate for magnification of the portion of the image by the expanded deformable region. Block S140 can therefore estimate a three-dimensional surface profile of the tactile layer across the deformable region in the expanded setting (e.g., based on a magnitude of a volume of fluid displaced into the dynamic tactile layer), estimating a non-uniform magnification of the digital display across the portion of the image by the deformable region in the expanded setting based on the estimated three-dimensional surface profile, and non-uniformly scale the portion of the image, rendered on the digital display, to compensate for the non-uniform magnification of the digital display by the deformable region in the expanded setting.

In an example of the foregoing implementation, Block S110 includes rendering—on a digital display within a mobile computing device—a first images of a locked home screen with a set of icons, each original icon in the set of icons corresponding to a native application installed on the mobile computing device. In this implementation, when the mobile computing device is unlocked, Block S130 expands a set of deformable regions into expanded settings, each deformable region adjacent an original icon rendered on the display, and Block S140 generate a second image (or "frame") including scaled and translated versions of the icons ("second icons") based on the user's viewing position relative to the mobile computing device and renders the second image on the digital display such that the second icons appear to the user as substantially undistorted and substantially centered on corresponding deformable regions—substantially regardless of the user's viewing position—as the deformable regions expand. For example, for each first icon, Block S140 can set a scaling value for the first icon based on a vertical position of the corresponding (i.e., adjacent) deformable region in the expanded setting, set a translation magnitude value and a translation direction for the first icon based on a vertical position of the corresponding deformable region in the expanded setting and the estimated viewing position of the user relative to the corresponding deformable region, and then apply the scaling value uniformly across the first icon and translate the first icon according to the translation magnitude and the translation angle in the first image to generate the second image.

Figure 6:
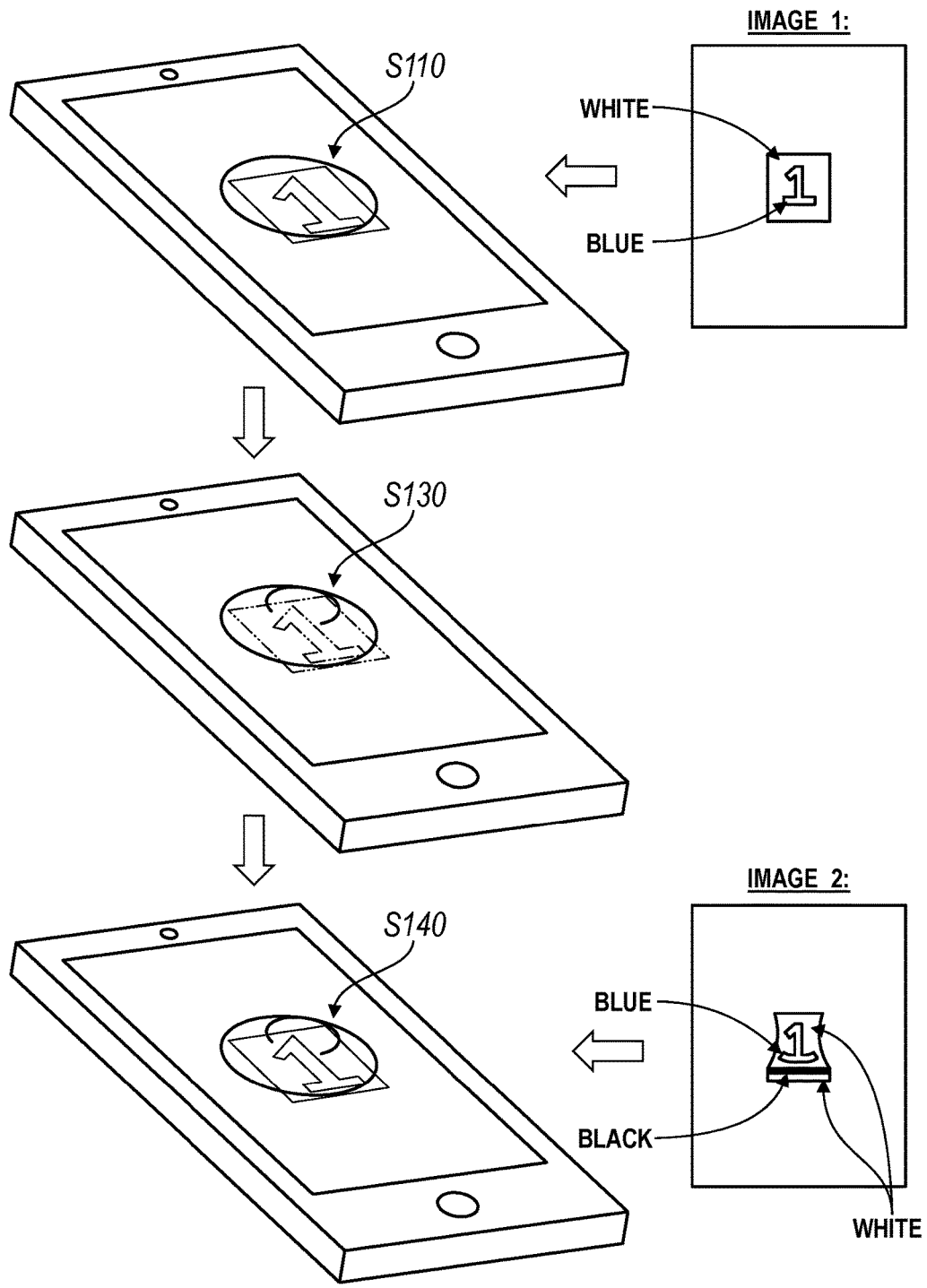
FIG. 6 is a flowchart representation of one variation of the method.

Furthermore, in the second image, Block S140 can shift to black a set of pixels in the digital display corresponding to an area of a first icon excluding an area of an intersection of the first icon and the second icon as rendered on the digital display, as shown in FIG. 6. In particular, distortion of light through the dynamic tactile layer may be greatest proximal a perimeter of a deformable region in the expanded setting, such as to a degree that chromatic dispersion (e.g., a "rainbow effect") around an expanded deformable region becomes noticeable to the human eye at a standard viewing distance to the digital display. Therefore, Block S140 can generate the second image that excludes visual data (i.e., includes only black) in areas corresponding to high degrees of optical distortion and not necessary to transmit comprehensible visual data of the corresponding icon. Alternatively, Block S140 can reduce a brightness (or light intensity) of the image at a region corresponding to an area of the first icon excluding an area of an intersection of the first icon and the second icon to reduce a perceived intensity of chromatic dispersion of light transmitted through the dynamic tactile layer. For example, Block S140 can uniformly or non-uniformly reduce brightness of a backlight across this region of the display. Similarly, Block S140 can set a color of this region of the image to a singular wavelength of light (e.g., 512 nm) or to a limited range of wavelengths of light (e.g., 509 nm to 515 nm) to limit chromatic dispersion of light transmitted through the dynamic tactile layer. Alternatively, Block S140 can extend a background color, background pattern, etc. of an adjacent portion of the image into this region of the image (i.e., into the region of the updated image behind the icon in the original image).

In one variation, Block S130 retracts the deformable region from the expanded setting in which the deformable region is substantially flush with the peripheral region to the retracted setting below the peripheral region such that the deformable demagnifies an adjacent portion of the image. In this variation, Block S140 can thus expand the adjacent portion of the image to compensate for a user's perceived demagnification of the portion of the image by the deformable region in the retracted setting. In one example, Block S140 can (linearly or nonlinearly) expand an image of an icon rendered on the display adjacent the deformable region to compensate for the transition of the deformable region into the retracted setting, such as by expanding the image of the icon over a background color or background pattern rendered on the display.

Therefore, Block S140 can prioritize one or more portions of the image rendered on the display for modification to compensate for optical distortion of the image due to a non-planar three-dimensional profile of the tactile surface. For example, Block S140 select prioritize icons for native applications on a home screen rendered on the display or icons for alphanumeric keys rendered on the display for scaling and/or translation to compensate for a varying thickness and/or material compensation of the dynamic tactile layer.

In another implementation, Block S120 generates a reference position matrix including the angle and distance of the user's eyes to a reference point on the computing device, as described above, and Block S120 crosses the reference position matrix with a display region matrix (e.g., specifying the location of each pixel of the digital display relative to the reference point) to generate a viewing position matrix specifying the user's viewing angle(s) for each portion (e.g., pixel, cluster of pixels) across the digital display, as shown in FIG. 2. In this implementation, Block S130 can generate a tactile surface position matrix defining the position of regions across the tactile surface, such as regions adjacent corresponding portions of the digital display, as shown in FIG. 2. For example, Block S130 can generate a tactile surface position matrix that specifies the vertical distance between a portion of the digital display and a corresponding region of the tactile surface, such as based on lookup table of deformable region positions corresponding to fluid pressure within corresponding fluid channels defined within the substrate, based on deformable region positions detected with a capacitive sensor coupled to the dynamic tactile layer as described in U.S. patent application Ser. No. 13/896,090, or based on a volume(s) of fluid pumped into the dynamic tactile layer. Finally, in this implementation, Block S140 can cross the viewing position matrix with the tactile surface position matrix to generate a transfer matrix, as shown in FIG. 2, and Block S140 can apply the transfer matrix to the image currently rendered on the digital display (i.e., the "original image") to generate an updated image (i.e., the "second image") including portions of the original image defined in new positions across the second image to compensate for a change in optical distortion of the original image resulting from a shift in the profile of the tactile surface and/or from a shift in the user's viewing position relative to the digital display.

As shown in FIG. 2, Block S140 can also generate an optical properties matrix that includes optical property information for one or more layers or materials within the dynamic tactile interface, such as refractive indices of the tactile layer, the substrate, and/or the fluid and a modulus of elasticity of the tactile layer. Block S140 can also generate a geometry matrix that includes geometry information of the dynamic tactile interface, such as the locations and geometries of fluid channels within the substrate, the locations and geometries of support members with corresponding cavities and adjacent corresponding deformable regions, and/or attachment point geometries for each deformable region, etc. Block S140 can thus cross the viewing position matrix and the tactile surface position matrix with an optical properties matrix and/or a geometry matrix to generate the transfer matrix, as shown in FIG. 2, that defines how an original image rendered on the digital display is to be modified to compensate for a change in optical distortion of the original image.

Block S130 can therefore select or generate a geometry matrix defining a profile of the tactile surface for the deformable region in the expanded setting for each discrete position (e.g., discrete area) in a set of discrete positions across the tactile surface, and Block S140 can transform the (original) image rendered on the digital display according to the viewing position matrix and the geometry matrix to generate a second image and then rendering the second image on the digital display. Block S130 can therefore generate the geometry matrix defining an effective thickness of the tactile layer across the peripheral region and the set of deformable region in the expanded setting for each discrete position in the set of discrete positions, and Block S140 can transform the (original) image into the second image further based on an index of refraction of the tactile layer and an index of refraction of a fluid arranged between the deformable region and the substrate.

Block S140 can further map virtual pixels the second image to real pixels in the digital display. In particular, in translating and/or scaling the original image to generate the updated second image, Block S140 can translate a virtual pixel of the original image to a virtual position within the second image corresponding to a nearest real pixel of the digital display. However, Block S140 can map scaled and/or translated portions of the original image to real positions of pixels of the digital display to generate the second image in any other suitable way.

Block S140 can also apply any of the viewing position matrix, the tactile surface position matrix, the optical properties matrix, and/or the geometry matrix to generate a light level matrix, and Block S140 can implement the light level matrix to adjust the brightness of one or more regions of the image to accommodate for internal reflection and/or other optical effects that reduce perceived light intensity across one or more regions of the image due to a change in a position of a deformable region and/or a shift in the user's viewing position relative to the digital display. However, Block S140 can function in any other way to modify the image to reduce, limit, compensate for, and/or substantially eliminate perceived optical distortion of an image rendered on the digital display.

In one implementation, Block S140 selects a transfer matrix from a set of stored transfer matrices, wherein each transfer matrix in the set of stored transfer matrices is based on empirical optical data. For example, empirical optical data can be generated by displaying an image (e.g., a black and white grid) on a display of a test dynamic tactile interface, transitioning one or more deformable regions of the test dynamic tactile interface between vertical elevations (e.g., fully expanded, partially expanded, fully retracted), moving a camera to various positions (e.g., different angles and distances) over the digital display, and capturing a photographic image of all or a portion of the digital display at each camera position and at various deformable region elevations. Each photographic image can then be compared to the displayed image (of known two-dimensional content) to generate a matrix approximating perceived optical distortion of an image rendered on the digital display as captured by a camera (like a human user) at a corresponding position over the digital display and for a known elevation of the deformable region(s). Each perceived optical distortion matrix can then be manipulated (e.g., inverted) to generate a transfer matrix corresponding to a particular user viewing position relative to the digital display and to an elevation of each deformable region. A set of such transfer matrices corresponding to various viewing positions and deformable region elevations can thus be uploaded to and stored on the dynamic tactile interface. Block S140 can thus receive a user viewing position from Block S120 and a deformable region elevation from Block S130, and Block S140 can select a particular transfer matrix—from the set of stored transfer matrices—that best matches the received user viewing position and the received deformable region elevation(s). Block S140 can then apply the select transfer matrix to an image currently rendered on the digital display to generate a new image that compensates for optical distortion of the image by the dynamic tactile layer and/or that compensates for a shift in the users viewing position relative to he digital display.

In the foregoing implementation, Block S140 can alternatively (linearly) interpolate a composite transfer matrix based on two or more stored transfer matrices corresponding to user viewing positions and/or deformable region elevations similar to (e.g., "near") the current user viewing position as determined in Block S120 and the deformable region elevation(s) set in Block S130. Block S140 can thus apply a 'stock' transfer matrix or a composite (e.g., interpolated) transfer matrix—based on multiple stock transfer matrices—to an image currently rendered on the digital display to reduce perceived optical distortion of the image by the user. However, Block S140 can function in any other way and/or apply any other suitable technique or method to modify the image displayed on the digital display.

7. Variations

In one variation of the method S100, Block S110 includes rendering the image on the digital display at a first time, Block S130 includes transitioning the deformable region into the expanded setting over a period of time succeeding the first time, the period of time terminating in a second time, and Block S120 includes cyclically refreshing an image rendered on the digital display according to a position of the deformable region over the peripheral region during the period of time. Generally, in this variation, the method S100 can cyclically detect the user's viewing position and update an image rendered on the digital display of the computing device to compensate for optical distortion of the image transmitted through the dynamic tactile layer, which may include one or more deformable region in expanded settings (i.e., in positions other than flush with the peripheral region).

In one example, Block S140 predicts a first perceived parallax of each pixel in the digital display by the user at a first time for the deformable region in the retracted setting, predicts a second perceived parallax of each pixel in the digital display by the user at a second time succeeding the first time for the deformable region in the expanded setting, and modifies the image to compensate for a change in perceived parallax of each pixel of the digital display from the first perceived parallax to the second perceived parallax. In a similar example, Block S130 includes transitioning the deformable region into the expanded setting at a first time, Block S110 includes rendering the image on the digital display substantially at the first time, Block S120 includes estimating a first viewing position of the user relative to the digital display substantially at the first time and estimating a second viewing position of the user relative to the digital display different from the first viewing position at a second time succeeding the first time, and Block S140 includes refreshing the image rendered on the digital display according to a difference between the first viewing position and the second viewing position.

Blocks S120 and S140 can thus repeat this process cyclically, such as at a refresh rate of the digital display, an image capture rate of a camera arranged within the computing device, or at an other preset rate, (e.g., 10 Hz), etc. For example, Block S140 can refreshing a transfer matrix—implemented as described above to adjust an image rendered on the digital display and defining transformation of images rendered on the digital display based on an estimated position of the user relative to the digital display—at the refresh rate. In this example, Block S140 can estimate a first perceived parallax of the image at the first time based on the first set of viewing angles at a set of discrete positions across the digital display, estimate a second perceived parallax of the image at the second time based on a second set of viewing angles of the user to the set of discrete positions across the digital display, and translate and scale a portion of the image to compensate for a difference between the first perceived parallax and the second perceived parallax. However, in this variation, Blocks S110, S120, S130, and S140 can repeat at any other rate and cooperate in any other way to adjust an image rendered on the digital display to compensate for a change in the user's viewing position and/or a position of one or more deformable regions within the dynamic tactile layer, which may other yield perception—by the user—of optical distortion of the image rendered on the display.

In another variation, the digital display includes in-pixel photodetectors configured to output signals corresponding to incident light on the digital display. In this variation, Block S140 can implement signals output from the in-pixel photodetectors to sense internal reflectance and/or other optical effects within the digital display and/or within the dynamic tactile interface. Block S140 can thus interface with the in-pixel photodetectors to measure local optical effects (e.g., internal reflection) within the digital display and/or within the dynamic tactile interface based on outputs of the in-pixel photodetectors, and Block S140 can calibrate an algorithm or any of the foregoing matrices based on these measured optical effects. For example, Block S140 can interface with the in-pixel photodetector to calibrate a retracted setting algorithm and/or matrix defining internal reflection of light across the dynamic tactile layer-digital display assembly for a set of deformable regions in the retracted setting and to similarly calibrate an expanded setting algorithm and/or matrix defining internal reflection of light across the dynamic tactile layer-digital display assembly for a set of deformable regions in the expanded setting. In this example, Block S140 can then adjust a brightness across an image rendered on the digital display based on a difference between the expanded setting algorithm and/or matrix and the retracted setting algorithm and/or matrix as the set of deformable regions transitions from the retracted setting into the expanded setting. However, the method S100 can function in any other way to reduce perceived optical distortion of light output through a dynamic tactile interface.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, native application, frame, iframe, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for reducing perceived optical distortion of light output through a dynamic tactile interface, the method comprising:
rendering an image on a digital display coupled to a substrate opposite a tactile layer, the substrate and the tactile layer being substantially transparent, the tactile layer defining a tactile surface, a peripheral region, and a deformable region, the peripheral region adjacent the deformable region and coupled to the substrate opposite the tactile surface, the deformable region disconnected from the substrate and operable between a retracted setting and an expanded setting, the tactile surface at the deformable region being substantially flush with the tactile surface at the peripheral region in the retracted setting and offset above the tactile surface at the peripheral region in the expanded setting;
estimating a viewing position of a user relative to the digital display;
transitioning the deformable region from the retracted setting into the expanded setting; and
modifying a portion of the image rendered on the digital display according to the estimated viewing position of the user and a profile of the tactile surface across the deformable region in the expanded setting,
wherein
estimating the viewing position of the user comprises capturing a photographic image of the user through a forward-facing camera arranged within a computing device coupled to the dynamic tactile interface, detecting eyes of the user within the photographic image, and generating a viewing position matrix defining an angel between the eyes of the user and the digital display along a first axis of the tactile layer and an angle between the eyes of the user and the digital display along a second axis of the tactile layer for each discrete position in a set of discrete positions across the tactile layer based on a position of the eyes within the photographic image; and
modifying the portion of the image rendered on the digital display comprises selecting a geometry matrix defining a profile of the tactile surface for the deformable region in the expanded setting for each discrete position in the set of discrete positions, transforming the image rendered on the digital display according to the viewing position matrix and geometry matrix to generate a second image, and rendering the second image on the digital display.

2. The method of claim 1,
wherein rendering the image on the digital display comprises rendering a first frame comprising an icon for an input key of a computing device coupled to the dynamic tactile interface, the icon substantially aligned with the deformable region in the retracted setting in the first frame; and
wherein modifying the portion of the image comprises generating a second frame comprising a scaled and translated version of the icon and rendering the second frame on the digital display in response to transitioning the deformable region into the expanded setting.

3. The method of claim 2, wherein modifying the portion of the image comprises shifting to black a set of pixels in the digital display, the set of pixels corresponding to an area of a first icon excluding an area of an intersection of the first icon and a second icon as rendered on the digital display.

4. The method of claim 2, wherein modifying the portion of the image comprises non-uniformly reducing backlight intensity of a set of pixels in the digital display, the set of pixels corresponding to an area of a first icon excluding an area of an intersection of the first icon and a second icon as rendered on the digital display.

5. The method of claim 2, wherein scaling the icon and translating the icon from the first frame to generate the second frame comprises setting a scaling value based on a vertical position of the deformable region in the expanded setting, setting a translation magnitude value and a translation direction based on a vertical position of the deformable region in the expanded setting and the estimated viewing position of the user, applying the scaling value uniformly across the icon, and translating the icon according to the translation magnitude value and the translation direction in the first frame to generate the second frame.

6. The method of claim 1, wherein transitioning the deformable region from the retracted setting into the expanded setting comprises displacing a volume of fluid through a fluid channel to expand the deformable region, the fluid channel fluidly coupled to a cavity cooperatively defined by the substrate and the deformable region.

7. The method of claim 6, wherein modifying the portion of the image rendered on the digital display comprises estimating a three-dimensional surface profile of the tactile layer across the deformable region in the expanded setting based on a magnitude of the volume of fluid, estimating a non-uniform magnification of the portion of the image by the deformable region in the expanded setting based on the estimated three-dimensional surface profile, and non-uniformly scaling the portion of the image rendered on the digital display to compensate for the non-uniform magnification of the portion of the image rendered on the digital display.

8. The method of claim 7, wherein modifying the portion of the image rendered on the digital display comprises estimating a change in perceived position of the portion of the image by the user through the deformable region between the retracted setting and the expanded setting based on the estimated three-dimensional surface profile and the estimated viewing position of the user, calculating a translation magnitude value and a translation direction to compensate for the change in perceived position of the portion of the image by the user, and translating the portion of the image rendered on the digital display based on the translation magnitude value and the translation direction.

9. The method of claim 1, wherein transforming the image rendered on the digital display comprises transforming the image into the second image further based on an index of refraction of the tactile layer and an index of refraction of a fluid arranged between the deformable region and the substrate.

10. The method of claim 1,
wherein transitioning the deformable region from the retracted setting into the expanded setting comprises transitioning a set of deformable regions from the retracted setting into the expanded setting; and
wherein selecting the geometry matrix comprises generating the geometry matrix defining an effective thickness of the tactile layer across the peripheral region and the set of deformable regions in the expanded setting for each discrete position in the set of discrete positions.

11. The method of claim 1, wherein generating the viewing position matrix comprises translating a position of the eyes within the photographic image to a viewing angle of the eyes to the forward-facing camera, translating a distance between the eyes within the photographic image to a viewing distance between the eyes and the forward-facing camera, and transforming the viewing angle and the viewing distance into an angle between the eyes of the user along the first axis and an angle between the eyes of the user along the second axis for each discrete position in the set of discrete positions across the tactile layer based on a location of each discrete position in the set of discrete positions across the tactile layer.

12. The method of claim 1,
wherein rendering the image on the digital display comprises rendering the image on the digital display at a first time;
wherein transitioning the deformable region from the retracted setting into the expanded setting comprises transitioning the deformable region into the expanded setting over a period of time succeeding the first time, the period of time terminating in a second time; and
wherein modifying the portion of the image rendered on the digital display comprises cyclically refreshing an image rendered on the display according to a position of the deformable region over the peripheral region during the period of time.

13. The method of claim 12, wherein modifying the portion of the image comprises predicting a first perceived parallax of each pixel in the digital display by the user at the first time for the deformable region in the retracted setting, predicting a second perceived parallax of each pixel in the digital display by the user at the second time for the deformable region in the expanded setting, and modifying the image to compensate for a change in perceived parallax of each pixel of the digital display from the first perceived parallax to the second perceived parallax.

14. The method of claim 1,
wherein transitioning the deformable region from the retracted setting into the expanded setting comprises transitioning the deformable region into the expanded setting at a first time;
wherein rendering the image on the digital display comprises rendering the image on the digital display substantially at the first time;
wherein estimating the viewing position of the user relative to the digital display comprises estimating a first viewing position of the user relative to the digital display substantially at the first time and estimating a second viewing position of the user relative to the digital display different from the first viewing position at a second time succeeding the first time; and
wherein modifying the portion of the image rendered on the digital display comprises refreshing the image rendered on the digital display according to a difference between the first viewing position and the second viewing position.

15. The method of claim 14,
wherein estimating the first viewing position of the user and the second viewing position of the user comprises estimating a new viewing position of the user relative to the digital display at a refresh rate, and
wherein modifying the portion of the image rendered on the digital display comprises refreshing a transfer matrix at the refresh rate, the transfer matrix defining transformation of images rendered on the digital display based on an estimated position of the user to the digital display.

16. A method for reducing perceived optical distortion of light output through a dynamic tactile interface, the dynamic tactile interface including a digital display coupled to a substrate opposite a tactile layer, the substrate and the tactile layer being substantially transparent, the tactile layer defining a tactile surface, a peripheral region, and a deformable region, the peripheral region adjacent the deformable region and coupled to the substrate opposite the tactile surface, the deformable region disconnected from the substrate, the method comprising:
transitioning the deformable region from a retracted setting into an expanded setting, the tactile surface at the deformable region being substantially flush with the tactile surface at the peripheral region in the retracted setting and offset from the tactile surface at the peripheral region in the expanded setting; and
at a first time, estimating a first viewing position of a user relative to the digital display;
substantially at the first time, rendering an image on the digital display based on the first viewing position and a profile of the tactile surface across the deformable region in the expanded setting, the image comprising a portion rendered on the digital display adjacent the deformable region in the expanded setting;
at a second time succeeding the first time, estimating a second viewing position of the user relative to the digital display; and
modifying a position of the portion of the image rendered on the display adjacent the deformable region based on a difference between the first viewing position and the second viewing position
wherein
estimating the first viewing position or estimating the second viewing position of the user comprises capturing a photographic image of the user through a camera arranged within a computing device coupled to the dynamic tactile interface, detecting eyes of the user within the photographic image, and generating a viewing position matrix defining an angel between the eyes of the user and the digital display along a first axis of the tactile layer and an angle between the eyes of the user and the digital display along a second axis of the tactile layer for each discrete position in a set of discrete positions across the tactile layer basedon a position of the eyes with in the photographic image; and
modifying the portion of the image rendered on the digital display comprises selecting a geometry matrix defining a profile of the tactile surface for the deformable region in the expanded setting for each discrete position in the set of discrete positions, transforming the image rendered on the digital display according to the viewing position matrix and the geometry matrix to generate a second image, and rendering the second image on the digital display.

17. The method of claim 16, wherein modifying the position of the portion of the image rendered on the display further comprises estimating a first perceived parallax of the image at the first time based on a first set of viewing angles, estimating a second perceived parallax of the image at the second time based on a second set of viewing angles of the user to the set of discrete positions across the digital display, and translating and scaling the portion of the image to compensate for a difference between the first perceived parallax and the second perceived parallax.

18. The method of claim 16, wherein transitioning the deformable region from the retracted setting into the expanded setting comprises displacing a preset volume of fluid into a fluid channel fluidly coupled to a cavity cooperatively defined by the substrate and the deformable region to expand the deformable region to a target height offset above the peripheral region.

19. A method for reducing perceived optical distortion of light output through a dynamic tactile interface, the method comprising:

rendering an image on a digital display, the digital display coupled to a tactile layer defining a tactile surface, a peripheral region, and a deformable region;

estimating a viewing position of a user relative to the digital display;

transitioning the deformable region from a retracted setting into an expanded setting, the tactile surface at the deformable region substantially flush with the tactile surface at the peripheral region in the retracted setting and offset from the tactile surface at the peripheral region in the expanded setting; and in response to transitioning the deformable region into the expanded setting, modifying the image rendered on the digital display according to the estimated viewing position of the user to compensate for a surface profile of the tactile layer at the deformable region in the expanded setting, wherein estimating the viewing position of the user comprises capturing a photographic image of the user through a forward-facing camera arranged within a computing device coupled to the dynamic tactile interface, and detecting eyes of the user within the photographic image, and generating a viewing position matrix defining an angel between the eyes of the user and the digital display along a first axis of the tactile layer and an angle between the eyes of the user and the digital display along a second axis of the tactile layer for each discrete position in a set of discrete positions across the tactile layer based on a position of the eyes within the photographic image; and modifying the image rendered on the digital display comprises selecting a geometry matrix defining a profile of the tactile surface for the deformable region in the expanded setting for each discrete position in the set of discrete positions, transforming the image rendered on the digital display according to the viewing position matrix and the geometry matrix to generate a second image, and rendering the second image on the digital display.

\* \* \* \* \*

UNITED STATES PATENT AND TRADEMARK OFFICE
CERTIFICATE OF CORRECTION

PATENT NO. : 9,557,813 B2  
APPLICATION NO. : 14/320041  
DATED : January 31, 2017  
INVENTOR(S) : Micah B. Yairi and Radhakrishnan Parthasarathy Page 1 of 1

It is certified that error appears in the above-identified patent and that said Letters Patent is hereby corrected as shown below:

In the Claims
In Column 23, Line 37, "angel" should read "angle"
In Column 26, Line 43, "angel" should read "angle"
In Column 26, Line 48, "basedon" should read "based on"
In Column 26, Line 49, "with in" should read "within"
In Column 28, Line 11, "angel" should read "angle"

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*